May 9, 1967 R. L. AAGARD 3,319,182

DOUBLE PUMPED LASER

Filed March 27, 1963

INVENTOR.
ROGER L. AAGARD
BY
ATTORNEY

United States Patent Office 3,319,182
Patented May 9, 1967

3,319,182
DOUBLE PUMPED LASER
Roger L. Aagard, Richfield, Minn., assignor to Honeywell Inc., a corporation of Delaware
Filed Mar. 27, 1963, Ser. No. 268,372
3 Claims. (Cl. 331—94.5)

This invention relates to masers and their more recent counterpart, lasers. In particular, this invention relates to a ruby laser in which two pumping sources having different output characteristics are applied to different portions of the ruby rod to obtain an enhanced high rising output pulse.

The purpose of this invention is to provide improved maser and laser devices having distinct portions of the medium stimulated by pumping sources whereby the devices may be more efficiently pumped and the output of the device enhanced.

Prior art pumping schemes have not considered the application of two pumping sources to separate sections of the laser or maser medium. However, it has been suggested by Stitch, Woodbury & Morse, Repetitive "Hair-Trigger" Mode of Optical Maser Operation, WESCON, 1961, that two light sources having different characteristics may be applied to the ruby rod of a laser. This pumping technique employs two separate flashlamps, both of which pump the entire length of a laser rod. A primary advantage is offered by double-pumping the ruby rod in separate sections in accordance with this invention. This allows the use of "Q-switching." Laser output associated with "Q-switching" has a much shorter rise time than ordinary laser output, making the device particularly suitable for ranging applications.

An object of this invention is to provide means for pumping a laser or maser medium in a manner whereby only a portion of the medium is directly affected by any single pumping source.

Another object is to provide means for confining the pumping energy applied to a laser medium to less than the full length thereof whereby the pumping energy is utilized more efficiently.

A further object is to provide a ranging type laser having two pumping sources confined to separate portions of the laser medium whereby enhanced sharp rising pulses may be obtained in the laser output.

With these and other objects in view, the invention will be described with regard to a ruby rod having light shielding means arranged around a portion thereof and so positioned as to confine the output of separate pumping sources to separate portions thereof.

Figure 1:
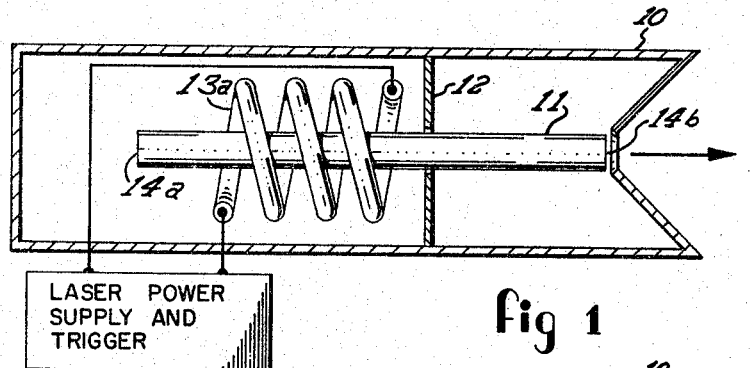
FIGURE 1 is a schematic drawing showing the relative positions of a light shielding means and a single pumping source in relation to the ruby rod of a laser.

Referring now to the drawings wherein like reference characters denote corresponding parts, the improved laser of this invention includes a cylindrical casing 10, a ruby rod 11, a cylindrical shield 12, and pumping sources such as flashtubes 13a and 13b.

FIGURE 1 discloses a laser utilizing a single pumping source the output of which is confined to less than the full length of ruby rod 11. The device includes casing 10 which may have an interior reflecting surface. Ruby rod 11 is doped with 0.05% chromium and has partially transmitting aluminum end mirrors 14a and 14b coated thereon. The material used for end mirrors 14a and 14b is not critical. Alternatives will be readily apparent to those skilled in the art. Ruby rod 11 is shown separated into two portions by light shield 12. A pumping source, such as helical flashlamp 13a, is shown adjacent to one of the regions of ruby rod 11. A power supply and trigger means are also shown connected to flashlamp 13a.

With the elements arranged in this manner, flashlamp 13a is activated by the power supply to optically pump a portion of ruby rod 11 thus causing a population inversion therein, which results in stimulated emission. With shield 12 confining the pumping energy produced by flashlamp 13a to one region of the rod, the threshold or on-set of stimulated emission had been found to be lowered when compared to be threshold of a comparable ruby laser configuration without shield 12.

Figure 2:
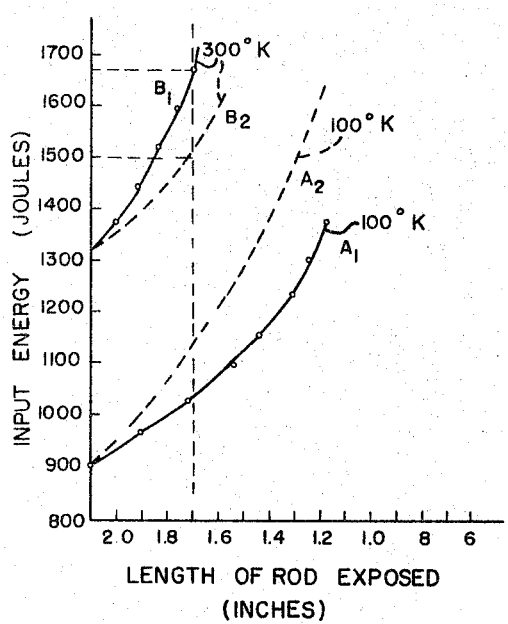
FIGURE 2 is a graph comparing theoretical threshold values (broken line) with actual threshold values (solid line) derived for devices having the structure shown in FIGURE 1 and in FIGURE 3.

Measurements at 100° K. indicate that the shielded region of ruby rod 11 introduces gain. Reference is made to FIGURE 2, curves $A_1$ and $A_2$, in this connection. Curve $A_1$ represents the actual threshold energy as a function of length of the ruby rod. Curve $A_2$ represents the theoretical threshold energy as a function of the length of the ruby rod exposed to pumping radiation. It is noted that the actual data (curve $A_1$) lies below theoretical (curve $A_2$). The mechanism for energy transfer to the shielded region of the rod remains to be clearly understood; but the result indicates that pumping efficiency can be increased as high as 20% by raising the pumping energy per unit length of ruby rod 11 and pumping less of the length.

Figure 3:
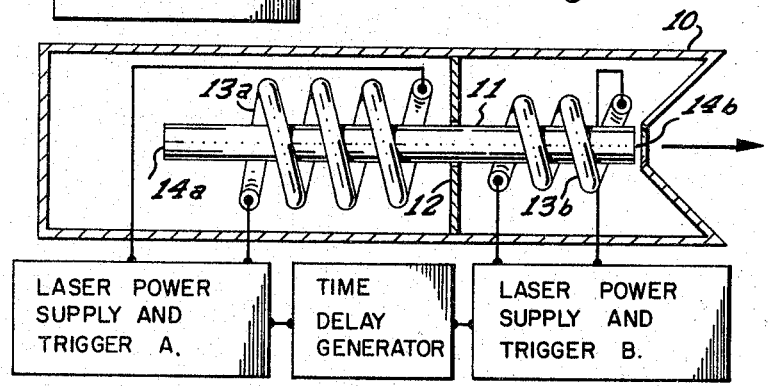
FIGURE 3 is a schematic drawing of a double-pumped ruby laser showing the relative positions of the light shielding means and two individual pumping sources.

Referring now to FIGURE 3, an embodiment of the invention is disclosed utilizing the concept of double-pumping the laser medium. The device includes casing 10 which may have an interior reflecting surface. Chromium doped ruby rod 11 again has partially transmitting aluminum end mirrors 14a and 14b. Ruby rod 11 is shown separated into two portions by light shield 12. A pumping source such as helical flashlamp 13a is shown adjacent one of the portions of the ruby rod 11. Power supply and trigger A is shown connected to flashlamp 13a. Power supply and trigger B is shown connected to flashlamp 13b. The power supplies A and B are interconnected by time delay generator means.

With the elements arranged in this manner, the portion of the ruby rod 11 exposed to flashlamp 13a is optically pumped upon activation of flashlamp 13a by laser power supply and trigger A, while the remainder of the ruby rod 11 remains unpumped by an external pumping source. Laser action is thereby forestalled by absorption in the unpumped section of ruby rod 11 until a substantial inversion is generated in the pumped portion of ruby rod 11, whereupon the absorber section is pumped by flashlamp 13b upon activation by laser power supply and trigger B to initiate stimulated emission.

Figure 4:
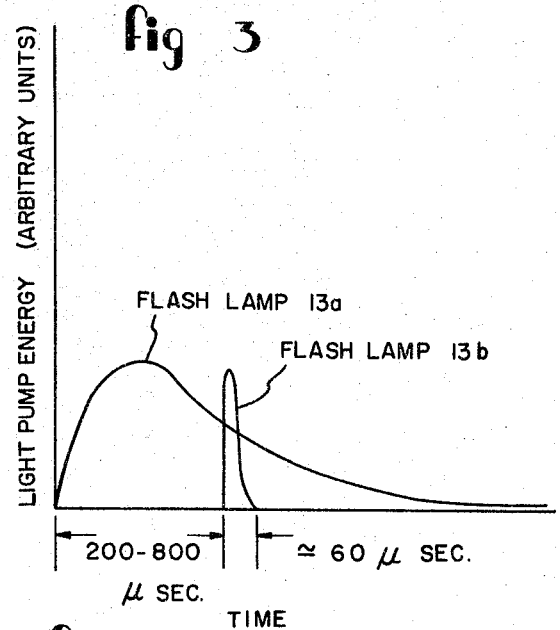
FIGURE 4 is a graph showing the relative outputs of the pumping sources in the double-pumped laser of FIGURE 3.

More particularly, the pumping sequence can be better understood in connection with FIGURE 4 in which the intensities of flashlamps 13a and 13b are shown as a function of time in FIGURE 4. Power supply A activates flashlamp 13a at a pumping energy just below that required to lase ruby rod 11 with flashlamp 13a only. Triggering 13a also starts the time delay generator means which electronically triggers power supply B to activate flashlamp 13b at approximately the same time that stimulated emission would occur if sufficient energy were supplied to flashlamp 13a only. The pumping output pulse of flashlamp 13a may be 30–800 microseconds, while the output pulse of flashlamp 13b may be 60 microseconds or less in duration with the second always less than the first.

Referring again to FIGURE 2, measurements at 300° K. (room temperature) indicate that double-pumping the ruby rod allows excess population inversion which results in increased output with high rise time. Curves $B_1$ and $B_2$ represent the actual threshold energy as a function of length of the ruby rod and the theoretical threshold energy as a function of the length of the ruby rod exposed to pumping energy respectively. It can be seen that if 1.75 inches of ruby rod are pumped, the actual threshold is 1670, whereas the theoretical threshold calculated for a similar unshielded ruby rod is 1500. This demonstrates that the effect of the shielded portion of the ruby rod is to raise the threshold by 170/1500 or about 10%. The population inversion is roughly about 10% larger at threshold due to the presence of the absorber portion of ruby rod. When the absorber portion is pulsed by the second pumping source, such as flashlamp 13b, it becomes transparent and the stored energy is made available for stimulated emission. Hence, the output pulse from the double-pumped laser has a total energy output approximately the same as if the ruby rod were pumped at 10% above threshold, but the pulse has a rise time characteristic of a Q-switched laser. Thus, enhanced pulses are generated by double-pumping a ruby rod. The device performs best at room temperature and above, due to broadening of the laser line. There are several modifications which may be included in the above device to improve the operation thereof.

One of the potential problems associated with the double-pumped laser is that of the absorber saturation. That is, when the major portion of the laser rod is pumped to a high population inversion, resonance absorption of fluorescent light in the absorber portion of the rod can produce saturation, rendering it ineffective as a means of forestalling laser action. It has been found that the amount of fluorescent light reaching the absorber portion can be reduced by reducing the solid angle subtended by the absorber portion.

It is well known that the high refractive index of ruby relative to air causes all light striking the ruby-air interface from inside the ruby rod, at an angle of incidence greater than about 35%, to be trapped by total internal reflection. Therefore, a high percentage of the fluorescent radiation emitted in the pumped section of the rod may reach the absorber portion and be trapped by resonance absorption. However, by applying an anti-reflection coating to the ruby cylinder walls or by grinding the walls to produce a diffusing surface, the amount of fluorescent radiation reaching the absorber is reduced by several hundred times. A coating such as a sapphire overlay on the main section of the ruby rod or grinding the walls is preferred. Although, high index liquids could be utilized but would not be preferred due to their troublesome physical and mechanical behavior.

Since the objective in these modifications is to reduce the solid angle subtended by the absorber, another solution is to leave a large space between the two sections of the ruby rod. However, this requires secure positioning of the two sections in order to maintain sufficient parallelism of the end mirrors. Therefore, this solution would have some drawbacks.

It will be understood that modifications may be made in the design and arrangement shown without departing from the spirit of the invention.

What is claimed is:
1. A laser comprising in combination:
a resonant cavity including a cylindrical ruby rod;
light shielding means arranged concentrically around said rod and adjacent an intermediate portion thereof, said shielding means separating said rod into first and second longitudinal portions;
a first flashlamp for applying pumping radiation only to said first portion, said first flashlamp having a predetermined output for a duration less than about 800 microseconds;
a second flashlamp for applying pumping radiation only to said second portion, said second flashlamp having a predetermined high rising output for a duration less than about 60 microseconds;
means for activating said first and second flashlamps; and
time delay means for delaying the activation of said second flashlamp for a predetermined interval following activation of said first flashlamp.

2. A laser comprising in combination:
a resonant cavity including a ruby rod;
radiation shielding means arranged concentrically around said rod and adjacent an intermediate portion thereof, said shielding means separating said rod into first and second longitudinal portions;
a first flashlamp for applying pumping radiation only to said first portion, said first flashlamp having an output of a first predetermined time duration;
a second flashlamp for applying pumping radiation only to said second portion; said second flashlamp having a high rising output for a second predetermined time duration which is less than said first predetermined time duration, and
time delay means for delaying the activation of said second flashlamp for a predetermined interval following activation of said first flashlamp.

3. A laser comprising in combination:
a resonant cavity including a laser medium;
radiation shielding means arranged concentrically around said laser medium and adjacent an intermediate portion thereof, said shielding means separating said laser medium into first and second longitudinal portions;
first means adjacent said first portion for applying pumping radiation only to said first portion;
second means adjacent said second portion for applying pumping radiation only to said second portion, and
time delay means for delaying the activation of said second means for a predetermined interval following activation of said first means.

References Cited by the Examiner
UNITED STATES PATENTS

| | | | |
|---|---|---|---|
| Re. 25,632 | 8/1964 | Boyle et al. | 331—94.5 |
| 2,929,922 | 3/1960 | Schawlow et al. | 331—94.5 X |
| 3,172,056 | 3/1965 | Stitch | 331—94.5 |
| 3,229,222 | 1/1966 | Sorokin et al. | 331—94.5 |
| 3,242,440 | 3/1966 | Koester et al. | 331—94.5 |

JEWELL H. PEDERSEN, *Primary Examiner.*

W. L. SIKES, *Assistant Examiner.*